US006019208A

United States Patent [19]

Vladymir

[11] Patent Number: 6,019,208

[45] Date of Patent: Feb. 1, 2000

[54] BILL VALIDATOR FOR BANK NOTE HAVING CONDUCTIVE STRIP

[75] Inventor: Barchuk Vladymir, Kiev, Ukraine

[73] Assignee: Cashcode Company Inc., Ontario, Canada

[21] Appl. No.: 08/974,710

[22] Filed: Nov. 19, 1997

[51] Int. Cl.[7] .............................. G07F 7/04; G01N 27/72

[52] U.S. Cl. .............................. 194/206; 324/233; 324/239

[58] Field of Search .............................. 194/206; 324/233, 324/234, 236, 239; 209/571, 534

[56] References Cited

U.S. PATENT DOCUMENTS

| | | | |
|---|---|---|---|
| 4,536,709 | 8/1985 | Ishida | 324/239 |
| 5,034,689 | 7/1991 | Inoue et al. | 324/233 |
| 5,419,424 | 5/1995 | Harbaugh | 194/206 |

*Primary Examiner*—Robert P. Olszewski
*Assistant Examiner*—Bryan Jaketic

[57] ABSTRACT

A device for validating the authenticity of a document uses changes in capacitance due to the presence of an electrically conductive security thread extending across the document. The device uses a drive arrangement for moving of a document such as a bank note, past a sensing arrangement which senses changes in capacitance due to movement of a security thread therepast. A frequency generator produces a high frequency time varying oscillator signal and provides this signal to an elongate oscillator electrode extending across the path of movement. A lead elongate measuring electrode is electrically conductive and positioned in front of the oscillator electrode and extends across said path and a trailing elongate measuring electrode is positioned behind the oscillator electrode and extends across the path. The signals from the measuring and the oscillator electrode are provided to a signal processing arrangement. The signal processing arrangement processes the signals relative to detect a phase shift between the signals caused by a conductive security thread passing by the electrodes. Sensing of the phase shift reduces sensitivity to variations caused by wobble of the bank note and changes in separation distance of the bank note from the sensor.

21 Claims, 5 Drawing Sheets

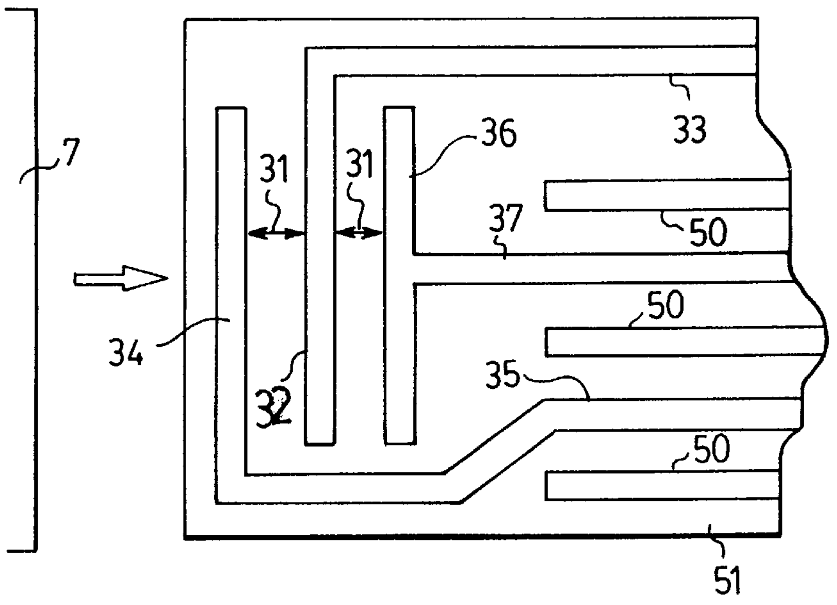
FIG. 2
FIG. 2A.
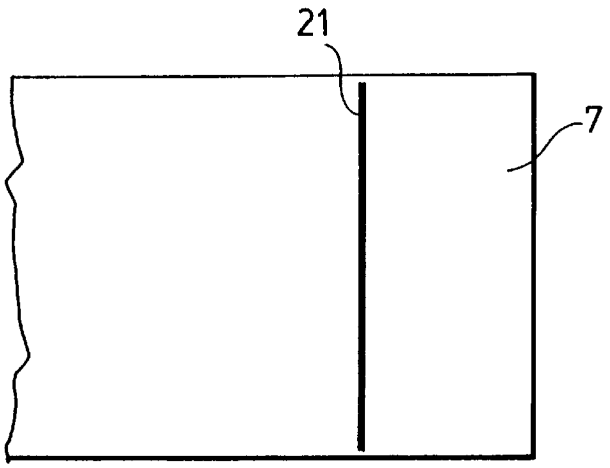

BILL VALIDATOR FOR BANK NOTE HAVING CONDUCTIVE STRIP

FIELD OF THE INVENTION

The present application relates to sensors used in validating devices for detecting of electrically conductive security threads provided in currency and other documents.

BACKGROUND OF THE INVENTION

It is known to provide electrically conductive security threads in currency such as U.S.currency. These security threads can be detected, using sensors which operate, based on changes in capacitance due to the presence of a security thread. The electrical conductivity of the security threads can be continuous or can be segmented.

U. S. Pat. No. 5,419,424 discloses a device for sensing of the security threads in a document. This patent discloses a structure which has a host of sensors and uses horizontal and vertically oriented electrodes in combination with a horizontally disposed feed electrode for distinguishing between security threads having discrete segments along the length thereof and a conductive line, such as a pencil line on a document.

As can be appreciated, sensing of security threads is used in combination with other sensing and evaluation techniques for collectively determining whether a particular document is authentic. Typically, the document is moved along a predetermined path and is moved past fixed sensors. These sensors provide input which is evaluated to provide a prediction whether the document is authentic as bill passes thereby. This evaluation and prediction occurs quickly as the consumer is typically waiting for the results, i.e. credit towards a purchase, etc.

In sensing currency, it can be appreciated that the condition of the currency can greatly vary from a relatively new crisp paper bill, to one which is quite worn and may have a series of creases or folds therein. The bill as it passes along the path, is normally controlled in a guide arrangement, however, there is some movement of the currency within the guide from the guide centerline, and thus the bill can wobble within the guide. This wobble can dramatically effect a capacitance sensor, which is relatively sensitive to changes in the separation distance between the bill and the sensor. Most capacitance sensors require the sensor to almost be in contact with the currency and this can cause the currency to jam in the validator. Thus with low separation spacing, the quality of the signal from the capacitance sensor improves, however there is a significant service and reliability problem, caused by jamming of bills in the validator. Furthermore, the wobble of the paper currency, as it passes through the validator, can also rapidly change the separation distance and the signals from the capacitance sensor. The signal from the capacitance sensor is expected to increase and decrease, however it is difficult to know whether these changes are caused by wobble or changing location of a security thread as it moves past a sensor.

In prior art devices there has been the tendency to decrease the separation distance between the sensor and the bill to improve the strength of the signal but this has not proven entirely satisfactory.

The present invention overcomes a number of these problems.

SUMMARY OF THE INVENTION

A device for validating the authenticity of a document, having an electrically conductive security thread extending across the document, according to the present invention, comprises a drive arrangement for moving the document in a lengthwise manner along a predetermined path of the device, a generator which provides a high frequency time varying oscillator signal, an elongate oscillator electrode which is electrically conductive and connected to the generator which applies the time varying oscillating signal to the electrode with the electrode being positioned to extend across the path, a lead elongate measuring electrode electrically conductive and positioned in front of the oscillatory electrode and again, extending across the path and a trailing elongate measuring electrode being electrically conductive and positioned behind the oscillatory electrode and extending across the path. The device further includes a signal processing arrangement connected to the measuring electrodes and receiving the output signals thereof to produce a measuring signal. The signal processing arrangement also receives the time varying oscillating signal as a reference signal. The signal processing arrangement processes the measuring signal relative to the reference signal to detect a change in electrical properties thereof caused by a conductive security thread passing by the electrodes.

With the arrangement as described above, the security thread causes a first change in capacitance with the lead measuring electrode when the security thread is between the lead electrode and the oscillatory electrode. Further movement of the document causes the security thread to then be located between the oscillatory electrode and the trailing elongate electrode. This arrangement with the lead measuring electrode to one side of the oscillatory electrode and the trailing elongate measuring electrode to the opposite side of the oscillatory electrode produces a phase shift between the measuring signal and the reference signal which is more easily detected. This sudden phase shift is easier to detect and distinguishes from changes in capacitance due to separation distance.

It has also been found with the present invention, that the positioning of the electrodes relative to the path can be quite large in the order of 1 to 1.2 mm and the space between the lead electrode and the oscillatory electrode is also approximately 1mm and the same separation distances found between the oscillatory electrode and the trailing electrode. This relatively large separation distance reduces the strength of the measuring signals, however, the phase shift can easily be detected even with weaker signals. This larger spacing reduces the effect of wobbling of the bill as it passes along the path as sensitivity significantly falls off with greater distances from the sensor. The greater distance reduces the possibility of jamming the document relative to the prior practice of reducing or minimizing the separation distance.

According to an aspect of the invention the signal generator produces an oscillatory signal having a frequency in the range of 50 to 150 Mhz. This frequency range is useful with respect to the larger separation distances and the separation distances between the electrodes.

In a preferred embodiment, two sensing arrangements are provided in opposed relation either side of the currency path. Different frequencies are used to reduce interference. With this arrangement, movement of the currency off the center line increases the signal in one sensing arrangement and decreases the signal in the opposite sensing arrangement. The signals are processed and the evaluation is based on the signals from both sensing arrangements.

BRIEF DESCRIPTION OF THE DRAWINGS

Preferred embodiments of the invention are shown in the drawings, wherein:

FIG. 2 is a partial top view showing the electrode sensing arrangement;

FIG. 2*a* is a top view of a document containing a security thread;

DETAILED DESCRIPTION OF THE PREFERRED EMBODIMENTS

Figure 1:
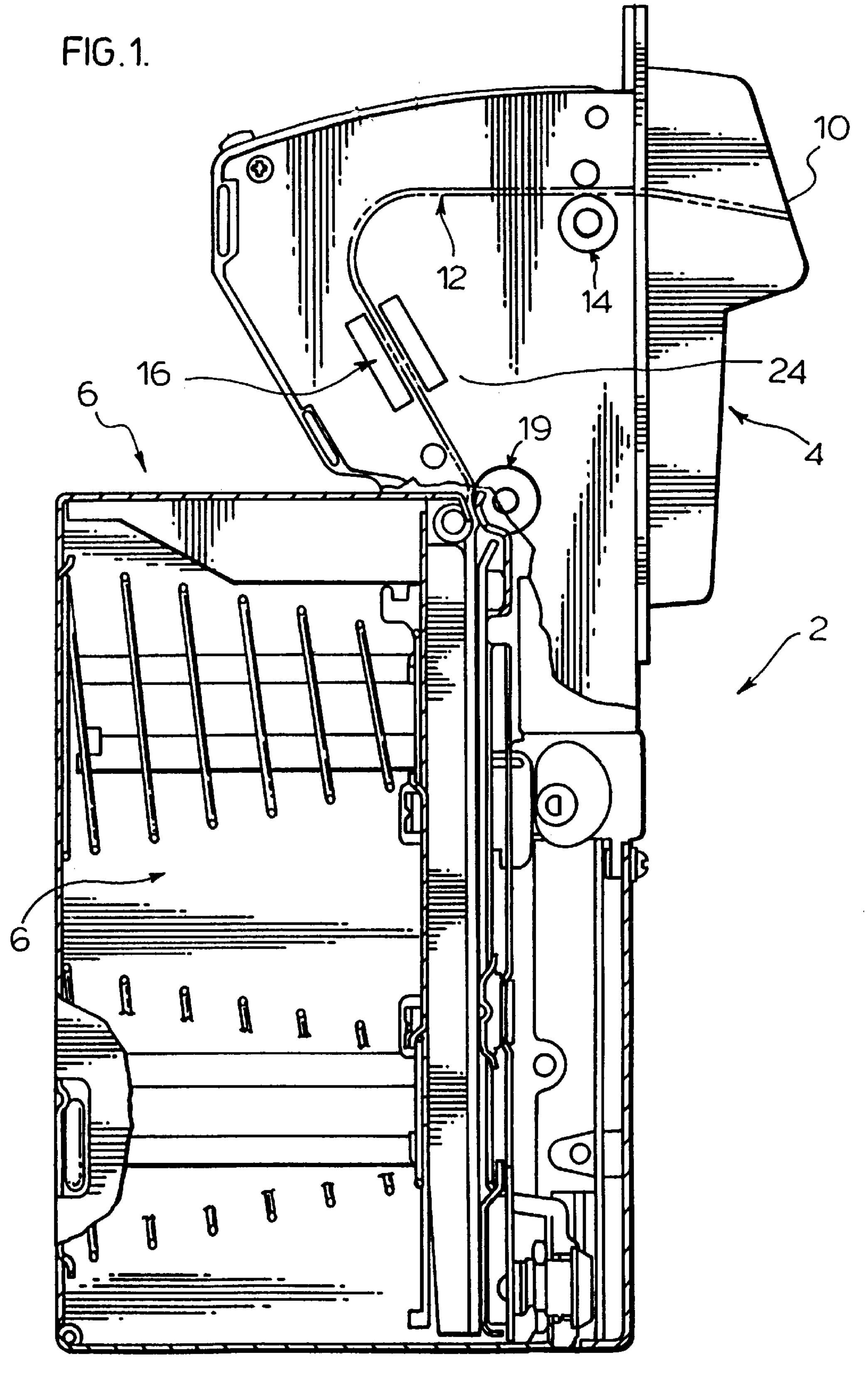
FIG. 1 a partial sectional view of a currency validator.

The currency validator 2 has a processing section 4 which cooperates and guides validated documents into the security box 6. A processing section 4 has an inlet 10 that allows the user to initially insert the document into the validator whereafter a drive arrangement 14 controls the movement of the document along the predetermined path indicated as 12. As the document moves along this predetermined path, it is evaluated by sensors 16 and 24 to determine whether it is authentic. If it is determined to be authentic, it is then passed into the security box 16. If it is rejected, the drive arrangement 14 typically reverses and ejects the document through the inlet 10.

There are a number of different ways to evaluate the validity of a document and typically a validator such as the one shown as 2 uses a number of different sensing and evaluation techniques for determining whether a bill is authentic. For example, this can include light emitting devices for determining reflected patterns, magnetic sensors and/or capacitance sensors.

The capacitance sensor of FIG. 2 comprises an oscillatory electrode 32 with a connecting portion 33. A lead measuring electrode 34 is positioned in front of the oscillatory electrode 32 relative to the direction of travel of the document through the validator. A trailing measure electrode 36 is provided to the opposite side of the oscillatory electrode and both the lead and the trailing measure electrodes are spaced from the oscillatory electrode a similar distance indicated as 31. The arrangement also includes ground shielding electrodes 50 associated with the connecting portions 33, 35 and 37. Arrow 9 shows the direction of travel of a document past the electrodes and it can be seen that each of the electrodes are placed across the width of the document and across the direction of travel indicated as 9. A document 7 is generally shown and is being fed to pass by the electrodes 32, 34 and 36. The document 7, as shown in FIG. 2*a* has a security thread 21 extending across the width of the document. This security thread is electrically conductive and can either be continuous or have discrete electrically conductive segments. The continuous security thread produces a stronger signal and will first be described.

As the security thread 21 passes by the lead electrode 34, it enters the gap between the lead electrode 34 and the oscillatory electrode 32. This effectively couples the two electrodes and produces a sudden increase in the signal from the lead electrode 34. As the document continues to move along the predetermined path, the capacitance coupling of the lead electrode and the oscillatory electrode decreases. As the security thread 21 passes over the oscillatory electrode, it then starts coupling with the trailing electrode 36.

Figure 3:
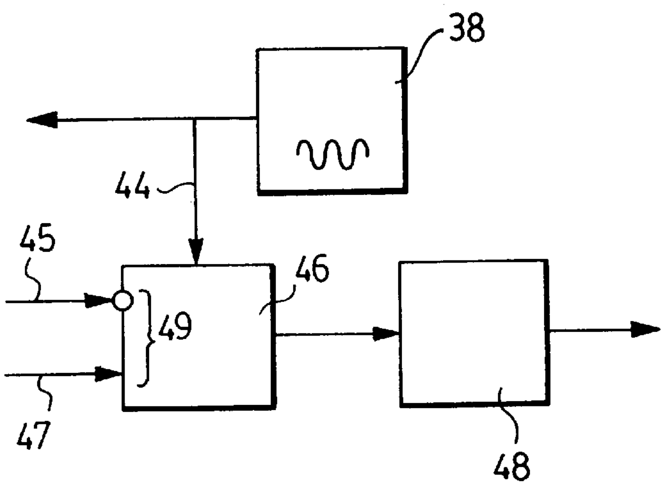
FIG. 3 shows the general signal processing arrangement.

FIG. 3 shows an overview of the signal processing arrangement. The high frequency signal generator 38 feeds a signal to the oscillatory electrode 32. This high frequency signal is also provided to the synchronous detector 46. Thus, a reference signal 44 which is basically the high frequency signal being fed to the oscillatory electrode 32, is provided to the synchronous detector 46. The synchronous detector 46 receives the signal 47 from the lead measuring electrode and signal 45 from the trailing electrode. The difference between these signals is determined and produces a further measuring signal 49. The synchronous detector 46 uses the measuring signal 49 and the reference signal 44 to determine a phase shift, in particular, a one hundred eighty degree phase shift between the signals, indicative of the security thread passing by the lead and trailing measuring electrodes as it is moved along the path 12.

Returning to FIG. 2, it can be seen that the three electrodes are parallel strips of conductors supported by dielectric film 51. The oscillatory electrode is in the center of the sensor's active area. Measuring electrodes are parallel and symmetric about the oscillatory electrode and form equal capacitance therewith. The size of spaces between the oscillatory electrode and the measuring electrodes is chosen on the basis of considerations as will be more fully described. The connecting portions of the measuring electrodes and the oscillatory electrode are extended to provide connection to corresponding terminals of the sensing unit. Between these connecting portions are the shielding conductors which are connected to the ground terminal.

As shown in FIG. 3, the output from the synchronous detector 2 is fed to an A/C amplifier 48. This allows for convenient processing of the signal and allow it to be converted to a digital signal for assessment.

The electrodes are placed in the validator over the pathway and the document is pulled lengthwise through the device. With this arrangement, the security thread is parallel to the longitudinal axis of the electrodes. When the document is pulled under the sensor, certain portions of the bank note pass beneath the sensor in sequential order. As the dielectric character of the bank note paper and the dye used in the printing process are quite uniform, the capacitance signals from the measuring electrodes relative to the oscillatory electrode remains generally the same but of opposite phase. Furthermore, it can be appreciated even if there is some variation of the separation of the document from the sensor, it occurs to both of the measuring electrodes thus changes to separation essentially subtract out. More important, these signals are easily distinguishable from signals caused by a security threat.

Figure 5:
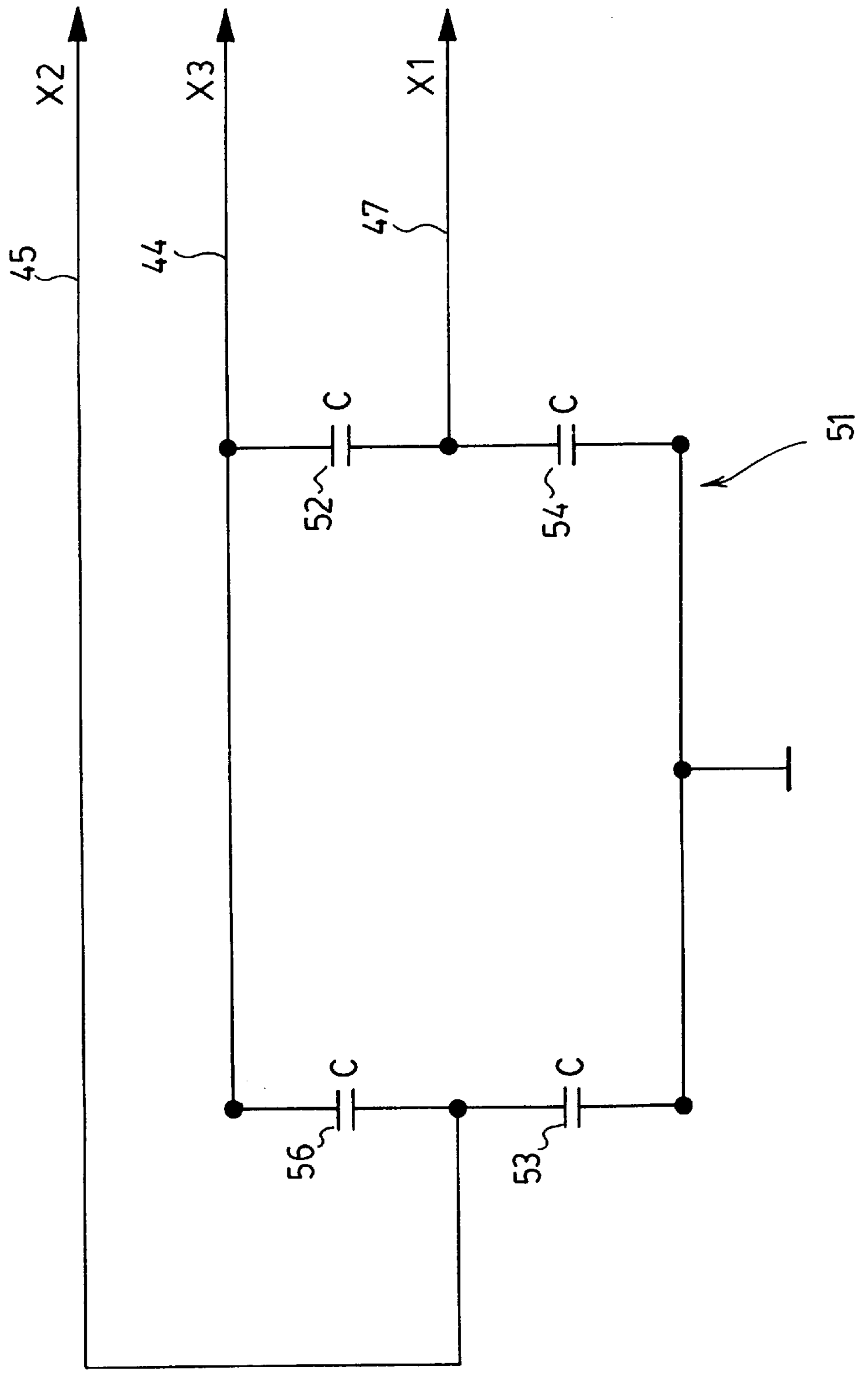
FIG. 5 shows a schematic equivalent of the electrode sensing arrangement.

FIG. 5 shows a schematic of the equivalent capacitance bridge circuit created by the arrangement of the electrodes 32, 34, 36 and 50 in the sensor. The bridge circuit 51 registers a change in capacitance and phase when a bank note security strip passes over it. The schematic represents a sensor energized by high frequency oscillator 38 provided on electrode 44 and having no bank note around the sensor. Output signals 47 and 45 are fed to the synchronous detector.

As shown in FIG. 5, the bridge circuit 51 comprises a two sections: a first section associated with the leading electrode and a second with the trailing electrode. In the first section, capacitance 52 is created by the electric field between leading electrode 34 and oscillatory electrode 32. Impedance 54 is formed by leading electrode 34, ground shielding electrode 50 and the impedance of the differential inputs of synchronous detector 46. In the second section, capacitance 56 is formed between trailing electrode 36 and oscillatory electrode 32. Impedance 53 is formed by trailing electrode 36, ground shielding electrode 50 and the impedance of the differential inputs of synchronous detector 2.

Figure 6:
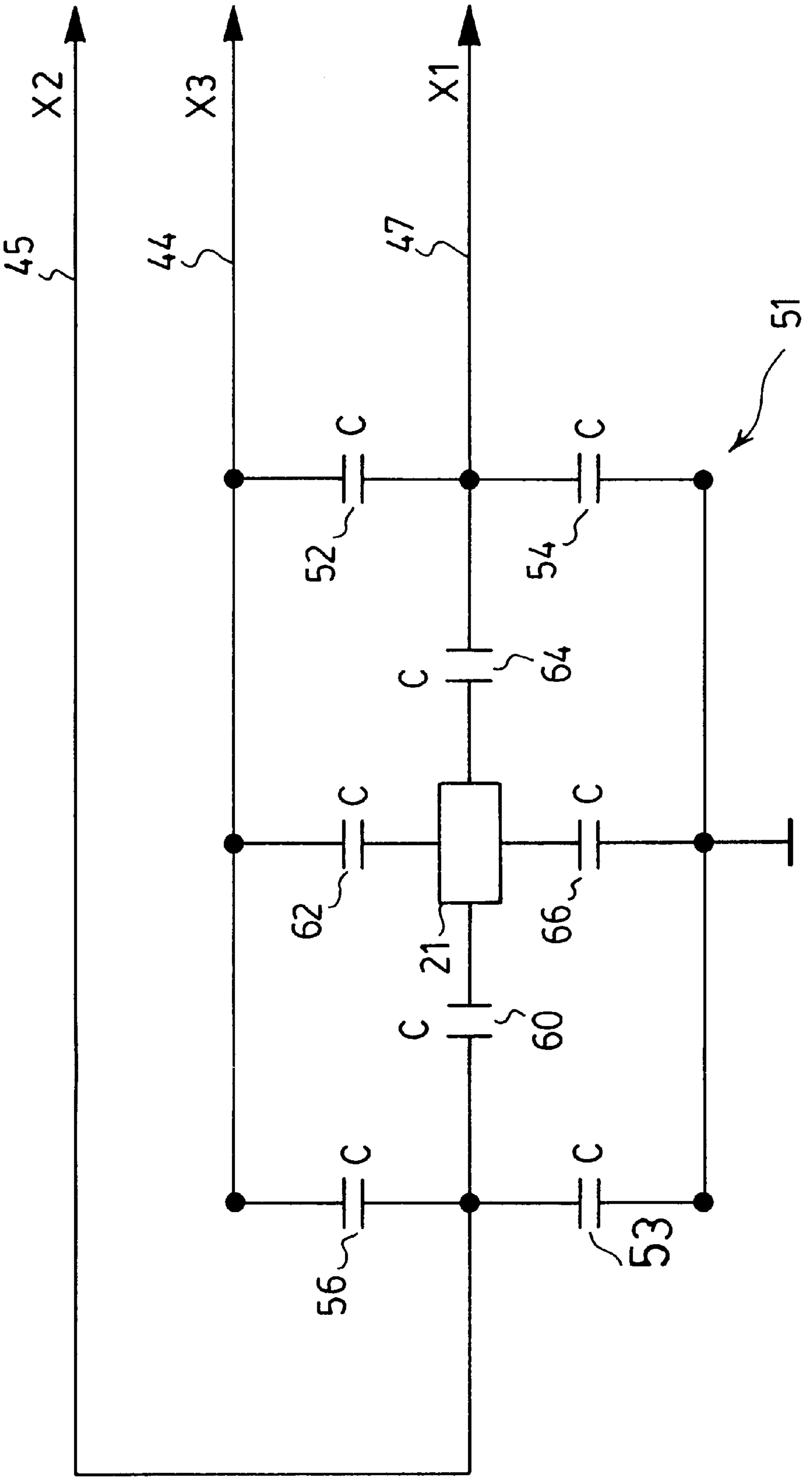
FIG. 6 shows a schematic equivalent of the electrode sensing arrangement when a bill containing a security thread is detected.

FIG. 6 shows the impedances present in bridge circuit 51 as security strip passes 21 by it, wherein capacitances are formed between the strip and each electrode, thereby increasing the total capacitance in the bridge circuit 51. These are noted as capacitances 60, 62, 64 and 66.

The size of capacitance 66 between security strip 21 and ground 50 depends on the type of security strip 21. A continuous strip of metal will create a relatively high capacitance value for capacitance 66; a series of discrete metallic sections in security strip 21 will create a small capacitance but one which can be distinguished from the signal where there is no security threat.

As the security strip passes between the leading electrode and the oscillatory electrode, the impedance in the first section of the bridge circuit greatly increases. Then, as the security strip passes between the trailing electrode and the oscillatory electrode, the impedance in the second section of the bridge circuit greatly increases, while the impedance in the first section decreases.

These changes in the impedances unbalances the bridge circuit, which in turn changes the high frequency signal fed to the input of the synchronous detector. As the first and second sections of the bridge are on opposite sides of the oscillatory electrode, the impedance of one section is out of phase with the other by 180°. As such, when the impedance in the second section is greater than the first section, there is a change, by one hundred eighty degrees in the high frequency signals phase in relation to the reference signal coming from the high frequency oscillator.

Thus, as a result of passing of the security strip close to the sensor at the output of the synchronous detector 46, there is an increase in voltage first in one polarity and then in the opposite polarity. This voltage, after being amplified with A/C amplifier 43 is sufficient enough for further processing of the signal. The use of the A/C amplifier makes it possible to reduce the requirements for balancing of the bridge and synchronous detector 46 such that manual adjustments for balancing is not required. Basically there is enough tolerance in this system that even if the bridge is slightly unbalanced, this phase shift is still easy to detect. This simplifies the circuitry and the cost thereof.

When the bank note passes along the pathway in the validator, the distance between the bank note and the sensor can vary. Such variations are due to the particular bank note, i.e. it can be rippled or have bends and its position in the guide varies. This changing separation distance creates additional noise which can contribute to unbalancing the bridge at the moment of the bank notes passage and on the other hand produces changes in amplitude of the signal formed by the conducted security strip. By increasing the spacing of the sensor from the center line of the predetermined path, the variations in the distance between the sensor and the bank note do not rapidly change the signal, i.e. the sensitivity is reduced. It is known that these creases etc. cause wobbling as the bank note passes through the validator and this wobble is typically in the range of 0.2 to 0.3 mm. The sensor is preferably placed 3 to 5 times this wobble distance away from the center line and is preferably spaced approximately 1 to 1.2 mm away. With this arrangement, wobble can be tolerated. To completely eliminate wobble, is not practical as it is likely to cause jamming.

It has been found that this arrangement also can be used for electrically conductive security threads which are continuous or in discrete segments. Basically the phase is opposite between continuous and discrete due to capacitance effect of the security thread with the case. In any event, this phase detection works for both types of security threads.

It can be appreciated that the invention may comprise the use of one or two sensors. In a one sensor embodiment described above, a single bridge circuit provides all the signals to the synchronous detector.

In a two sensor embodiment, two sensors are located in the validating device, such that they oppose each other and that the document to be validated passes between them. FIG. 1 shows a validator with two sensors, 16 and 24. The two sensor arrangement allows for a cumulative capacitance signal to be generated as a security strip passes between the sensors. The two sensing arrangements are provided to opposite sides of the guide such that a change in position increases the signal in one sensing arrangement and decreases the signal in the other sensing arrangement. Combining the signals contribute to reducing the effect of wobble.

Figure 4:
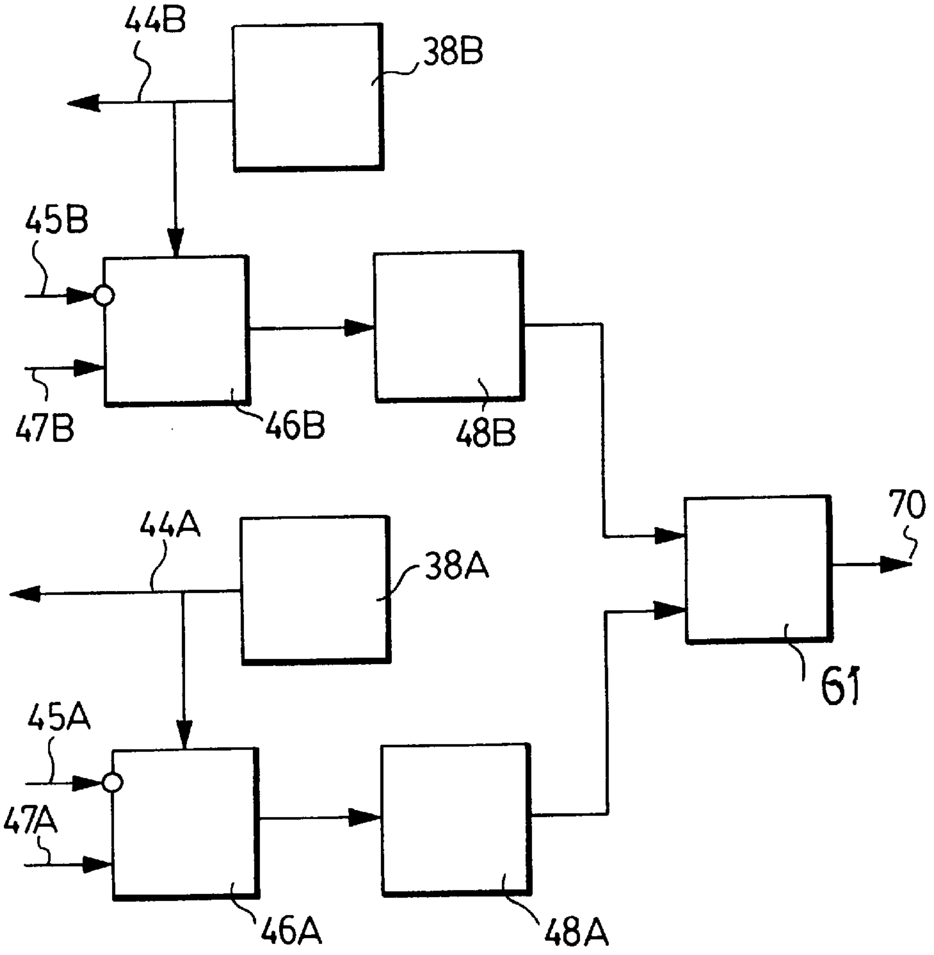
FIG. 4 shows an alternate embodiment of the invention.

FIG. 4 shows a block diagram of the two sensor arrangement. Essentially, the two sensor arrangement has two functionally identical, but separate signal processing arrangements. Each signal processing arrangement operates as the arrangement described in FIG. 3.

FIG. 4 shows each sensor arrangement distinguished from each other with A and B suffix notations. As such, the two signal processing arrangements comprise synchronous detectors 46A and 46B, high frequency generators 38A and 38B, amplifiers 48A and 48B, electrode signals 45A, 45B, 47A and 47B and reference signals 44A and 44B. Outputs from amplifiers 48A and 48B are fed to signal summing arrangement 61, which produces output signal 70, which can be converted to a digital signal for processing.

If bills wobble as they pass by a sensor, the distance of the bill from the sensor will vary. Two sensors allow the validation system to compensate for wobble distance of a document from a single sensor. As a document passes between the two sensors, it will be closer to one of the sensors. As such, the cumulative capacitance signal from the two sensors reduces variation in the signal caused by wobble. In order to minimize any cross-talk between the signals of one sensor to another, high frequency generators 38A and 38B each generate frequencies that are different from each other and that are not harmonics of each other. For example, the frequencies of the generators preferably have a 10% to 20% difference.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A device for validating the authenticity of a document having an electrically conductive security thread extending across the document, said device comprising a drive arrangement for moving the document in a lengthwise manner along a predetermined path of the device, a generator producing a high frequency time varying oscillator signal, an elongate oscillator electrode being electrically conductive and connected to said generator which applies said time varying oscillator signal thereto, said elongate oscillator electrode being positioned to extend generally across said path, a lead elongate measuring electrode being electrically conductive and positioned in front of said oscillator electrode and extending across said path, a trailing elongate measuring electrode being electrically conductive and positioned behind said oscillator electrode and extending across said path, a reference ground electrode, a signal processing arrangement connected to said measuring electrodes and receiving the outputs thereof and producing a measuring signal, said signal processing arrangement also receiving said time varying oscillator signal as a reference signal, said signal processing arrangement processing said measuring signal relative to said reference signal to detect a phase shift therebetween caused by a conductive security thread passing by said electrodes, and wherein said processing arrangement includes a synchronous detector which compares a differential signal derived from said measuring electrodes to said reference signal and detects said change in phase.

2. A device for validating the authenticity of a document as claimed in claim 1 wherein said elongate measuring electrodes are each spaced from said oscillator electrode approximately 1 mm.

3. A device for validating the authenticity of a document as claimed in claim 2 wherein said electrodes on average are spaced approximately 1 mm from a document as it moves past said electrodes.

4. A device for validating the authenticity of a document as claimed in claim 3 wherein said generator produces an oscillator signal having a frequency of in the range of 50 to 150 MHz.

5. A device for validating the authenticity of a document as claimed in claim 4 wherein said device is designed to validate United States paper currency.

6. A device for validating the authenticity of a document as claimed in claim 1 wherein said processing arrangement further includes an AC amplifier for amplifying an output signal of said synchronous detector.

7. A device for validating the authenticity of a document as claimed in claim 6 including shielding electrodes associated with leads of each electrode to reduce the unwanted contributions in the signals from the measuring electrodes or the oscillator electrode due to changes in capacitance detected by the leads.

8. A device for validating the authenticity of a document as claimed in claim 1 wherein said path includes a document guide which maintains a document spaced from the electrodes at least 0.5 mm.

9. A device for validating the authenticity of a document as claimed in claim 1 wherein said security thread sensing arrangement may detect either a continuous segment or a plurality of discrete segments in said electrically conductive security thread.

10. A device for validating the authenticity of a document having an electrically conductive security thread extending across the document, said device comprising a drive arrangement for moving the document in a lengthwise manner along a predetermined path of the device and a pair of security thread sensing arrangements located generally opposite to each other at a location above and below said predetermined path, each said security thread sensing arrangement having a generator producing a high frequency time varying oscillator signal, an elongate oscillator electrode being a lead elongate measuring electrode being a trailing elongate measuring electrode being electrically conductive and positioned behind said oscillator electrode and extending across said path, a signal processing arrangement connected to said measuring electrodes and receiving the outputs thereof and producing a measuring signal, said signal processing arrangement also receiving said time varying oscillator signal as a reference signal, said signal processing arrangement processing said measuring signal relative to said reference signal to detect a phase shift therebetween caused by a conductive security thread passing by said electrodes, said device further comprising a summing arrangement receiving the outputs of said measuring signal from each said processing arrangement, said summing arrangement producing a cumulative detection signal when a security thread passes between said pair of security thread sensing arrangements.

11. A device for validating the authenticity of a document as claimed in claim 10 wherein said electrodes on average are spaced approximately 1 mm from a document as it moves past said electrodes.

12. A device for validating the authenticity of a document as claimed in claim 10 wherein each of said generator produces an oscillator signal having a frequency of in the range of 50 to 150 MHz.

13. A device for validating the authenticity of a document as claimed in claim 10 wherein said generators produce an oscillator signal differing approximately 10% to 20% from each other.

14. A device for validating the authenticity of a document as claimed in claim 10 and wherein said device is designed to validate United States paper currency.

15. A device for validating the authenticity of a document as claimed in claim 10 wherein said processing arrangement includes a synchronous detector which compares a differential signal derived from said measuring electrodes to said reference signal and detects said change in phase.

16. A device for validating the authenticity of a document as claimed in claim 15 wherein said processing arrangement further includes an AC amplifier for amplifying an output signal of said synchronous detector.

17. A device for validating the authenticity of a document as claimed in claim 16 including shielding electrodes associated with leads of each electrode to reduce the unwanted contributions in the signals from the measuring electrodes or the oscillator electrode due to changes in capacitance detected by the leads.

18. An arrangement for sensing electrical fields generated by a security thread in a document as said thread moves by said arrangement, said arrangement comprising a generator producing a high frequency time varying oscillator signal, an elongate oscillator electrode being electrically conductive and connected to said generator which applies said time varying oscillator signal thereto, said elongate oscillator electrode being positioned to extend generally across a path of travel of said document, a lead elongate measuring electrode being electrically conductive and positioned in front of said oscillator electrode and extending across said path, a trailing elongate measuring electrode being electrically conductive and positioned behind said oscillator electrode and extending across said path, a reference electrode providing an electrical ground for fields generated within said elongate oscillator electrode, said lead elongate electrode and said trading elongate electrode, and an output signal from said arrangement, wherein as said thread moves by said arrangement, said thread electrically couples with each said electrode producing a characteristic, collective electric field pattern in said arrangement, signifying a detection of said security thread.

19. The arrangement as claimed in claim 18 wherein said lead elongate measuring electrode, said elongate oscillator electrode and said reference electrode are positioned relative to each other to produce a first half of a bridge circuit and, wherein said trailing elongate measuring electrode, said elongate oscillator electrode and said reference electrode are positioned relative to each other to produce a second half of said bridge circuit.

20. An arrangement as claimed in claim 18 wherein said generator produces an oscillating signal by having a frequency in the range of 50 to 60 MHz.

21. An arrangement as claimed in claim 20 wherein said electrodes on average are spaced approximately 1 mm from said document as it moves past said electrode.

* * * * *